United States Patent [19]

Butler et al.

[11] Patent Number: 5,377,259
[45] Date of Patent: Dec. 27, 1994

[54] DATA TERMINAL HAVING PROGRAM LANGUAGE SUPPORT LIBRARY, AND RELATED METHOD

[75] Inventors: Myron C. Butler, Edmond, Okla.; Christopher Madore, Cypress, Calif.

[73] Assignee: Communications Manufacturing Company, Los Angeles, Calif.

[21] Appl. No.: 122,803

[22] Filed: Sep. 16, 1993

Related U.S. Application Data

[63] Continuation of Ser. No. 514,318, Apr. 23, 1990, abandoned.

[51] Int. Cl.⁵ ............................................. H04M 11/00
[52] U.S. Cl. ......................................... 379/93; 379/96; 379/97; 379/98; 379/21
[58] Field of Search ........................ 379/96, 97, 98, 21, 379/93, 355; 364/920

[56] References Cited

U.S. PATENT DOCUMENTS

| | | | |
|---|---|---|---|
| 3,673,329 | 6/1972 | Weld et al. | 179/3 |
| 3,778,556 | 12/1973 | Mees et al. | 179/90 K |
| 4,179,735 | 12/1979 | Lodi | 395/700 |
| 4,194,098 | 3/1980 | Carlson | 179/175 |
| 4,231,087 | 10/1980 | Hunsberger et al. | 395/325 |
| 4,268,721 | 5/1981 | Nielson et al. | 179/2 C |
| 4,656,651 | 4/1987 | Evans et al. | 379/1 |
| 4,707,848 | 11/1987 | Durston et al. | 379/96 |
| 4,724,521 | 2/1988 | Carron et al. | 364/300 |
| 4,791,661 | 12/1988 | Donaldson et al. | 379/96 |
| 4,799,254 | 1/1989 | Dayton et al. | 379/96 |
| 4,837,811 | 6/1989 | Butler et al. | 379/96 |
| 4,841,561 | 6/1989 | Hill | 379/355 |
| 4,922,516 | 5/1990 | Butler et al. | 379/21 |
| 5,121,497 | 6/1992 | Kerr et al. | 395/650 |

FOREIGN PATENT DOCUMENTS

| | | | |
|---|---|---|---|
| 0056895 | 8/1982 | European Pat. Off. | 15/20 |
| 0332184 | 9/1989 | European Pat. Off. | 379/96 |

OTHER PUBLICATIONS

*Telephony* article, "The Front A Hand-Held Computer" Sep. 1988 379/96, 21, 368, 433.
AT&T publication entitled Craft Access Terminal Designed for the Work Environment, Jun. 1985.
Telephony article entitled "Powerful new tool makes field craft more self-reliant", Sep. 2, 1985.
Telephone Engineer & Management article entitled "Tiny terminal ties telco team," Jul. 1, 1986.
NECSY publication entitled "Portable Craft Access Device STIM M 212", Feb. 20, 1988.
TELIC Publication entitled "TOPPS: Craft Access System", Oct., 1986.
Melard Technologies Inc. publication entitled "ACCESS II" and ACCESS II-80 copyright 1989 (product or other publication believed to be available before before Apr. 23, 1989).
Article entitled "The IXO Telecomputing System," 1983.
Hewlett Packard publication entitled "HP 110 Portable Computer Owner's Manual" Table of Contents, Mar. 1984.
Motorola publication entitled "KDT Portable Terminal 800 Series", 1984.
Motorola publication entitled "KDT-800 Portable Data Terminal", believed to be published at least one year prior to Apr. 23, 1990.
Abstract of SU 1439621 to Gorbachev et al. dated Nov. 23, 1988.

*Primary Examiner*—Curtis Kuntz
*Assistant Examiner*—Stella L. Woo
*Attorney, Agent, or Firm*—Dougherty, Hessin, Beavers & Gilbert

[57] ABSTRACT

A data terminal which enables a craft technician to communicate through a gateway processor to other computers includes a program language support library and an operating system which can receive a condensed form applications program and supplement the received program to create a fully executable applications program. This permits convenient downloading into the terminal over a conventional telephone circuit. Also disclosed is an improved interface through which a telephone circuit can be tested to determine if it is active and idle in a substantially non-invasive manner. Respective computer protocols can be entered in the terminal in association with telephone numbers of respective computers for automatic use whenever the respective computer is called. A limited display area of the terminal is controlled so that a larger page of text can be sequentially displayed through it as if the limited display area is scanning across the larger page of text.

9 Claims, 16 Drawing Sheets

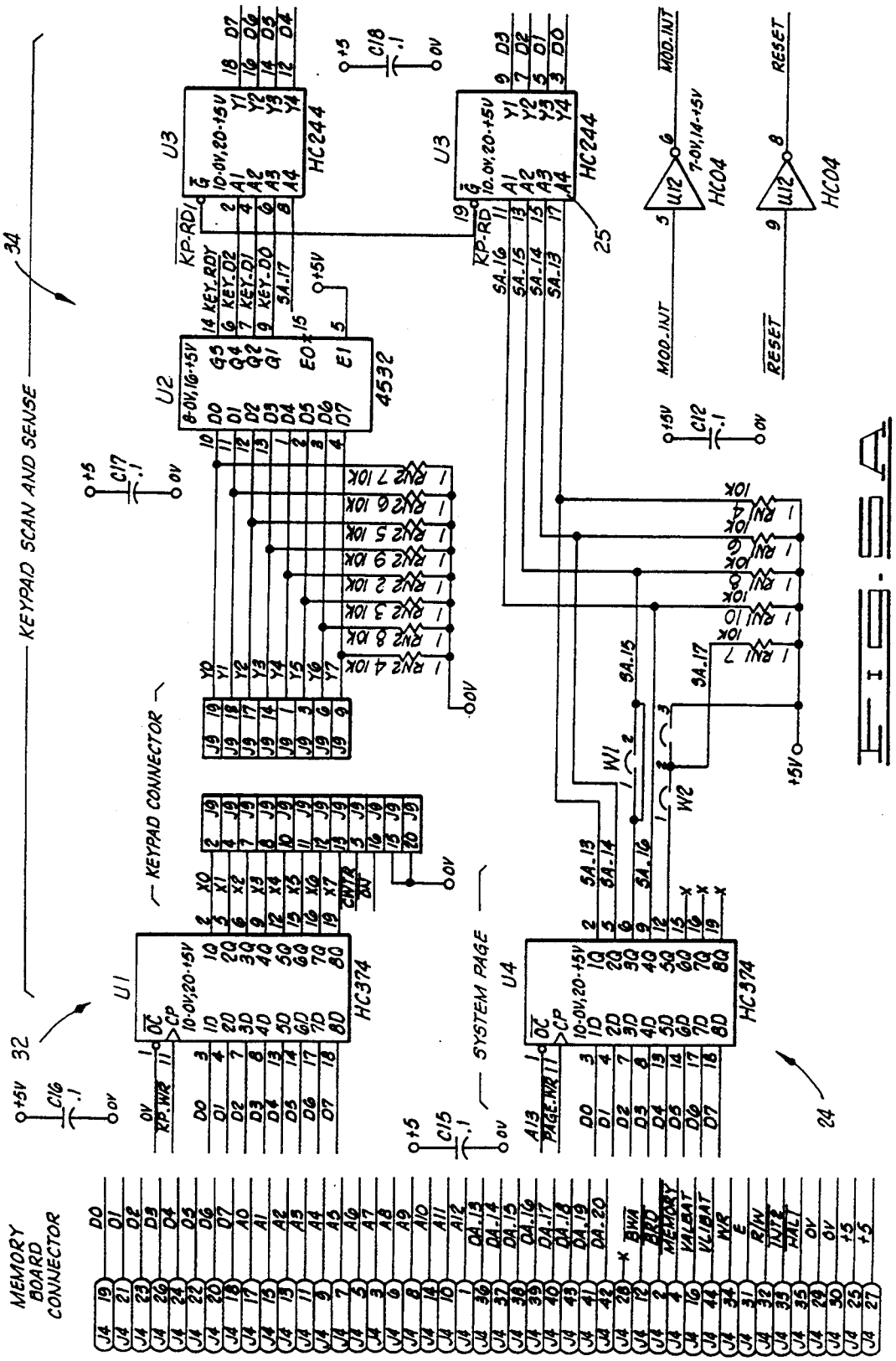

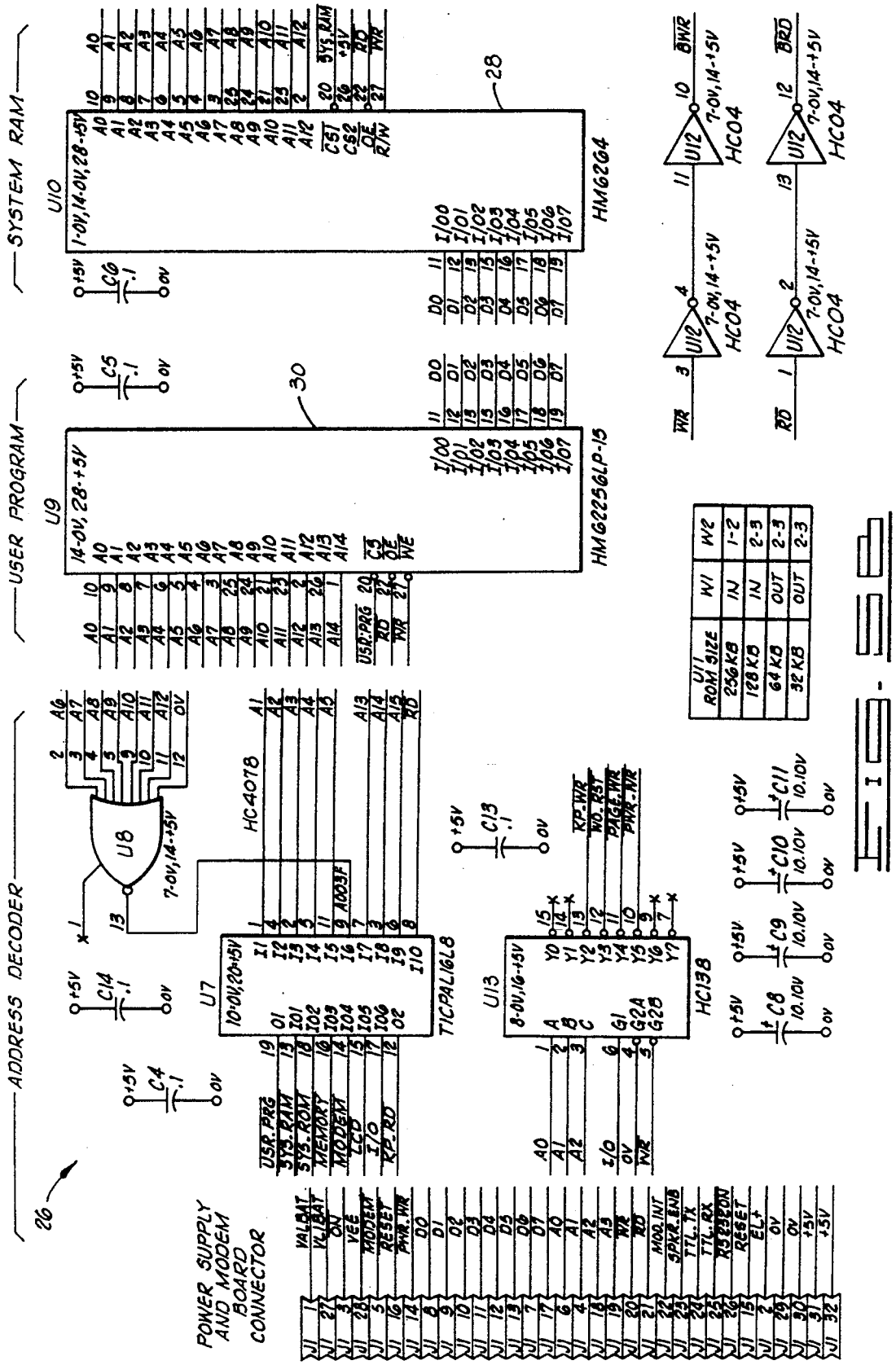

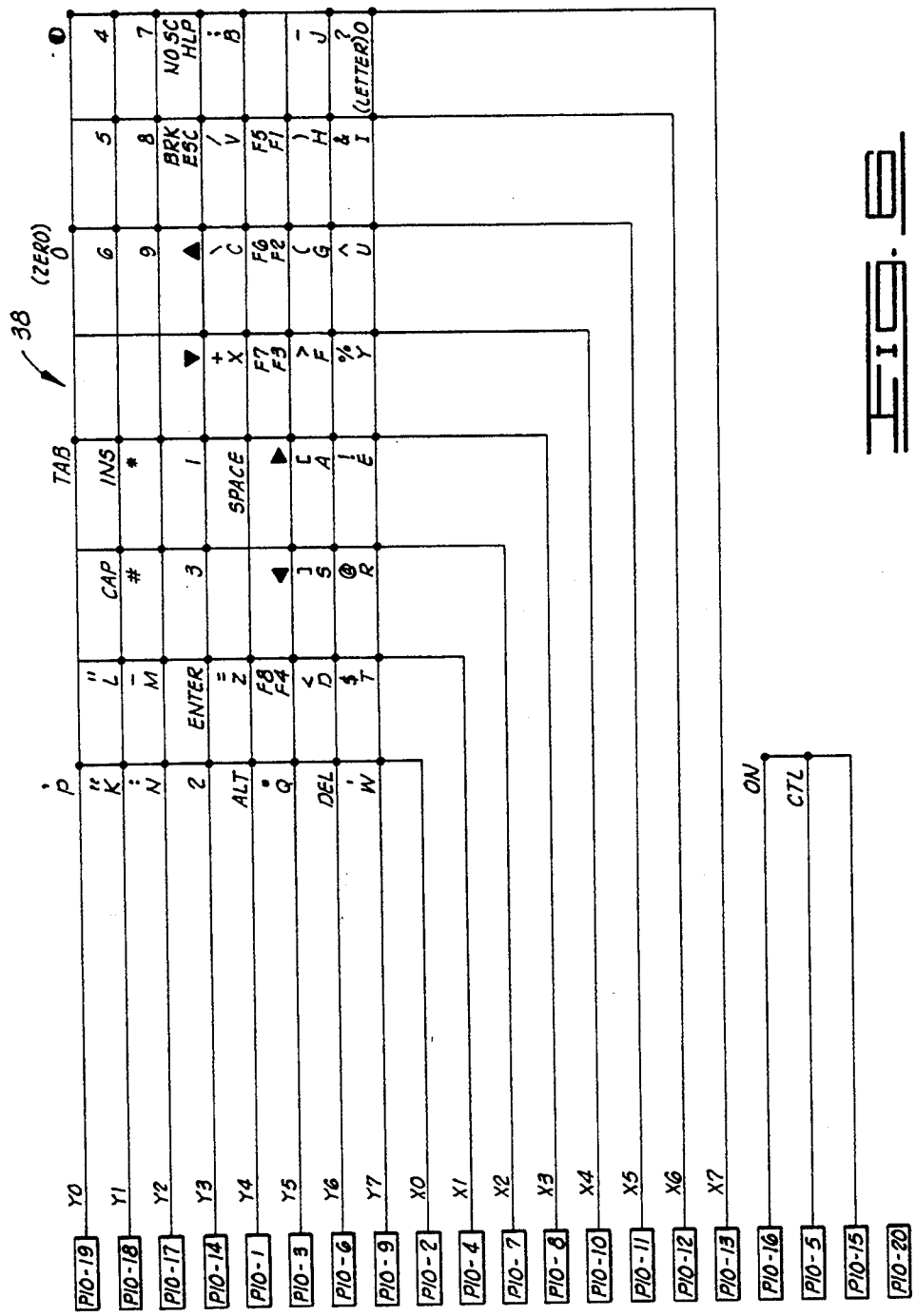

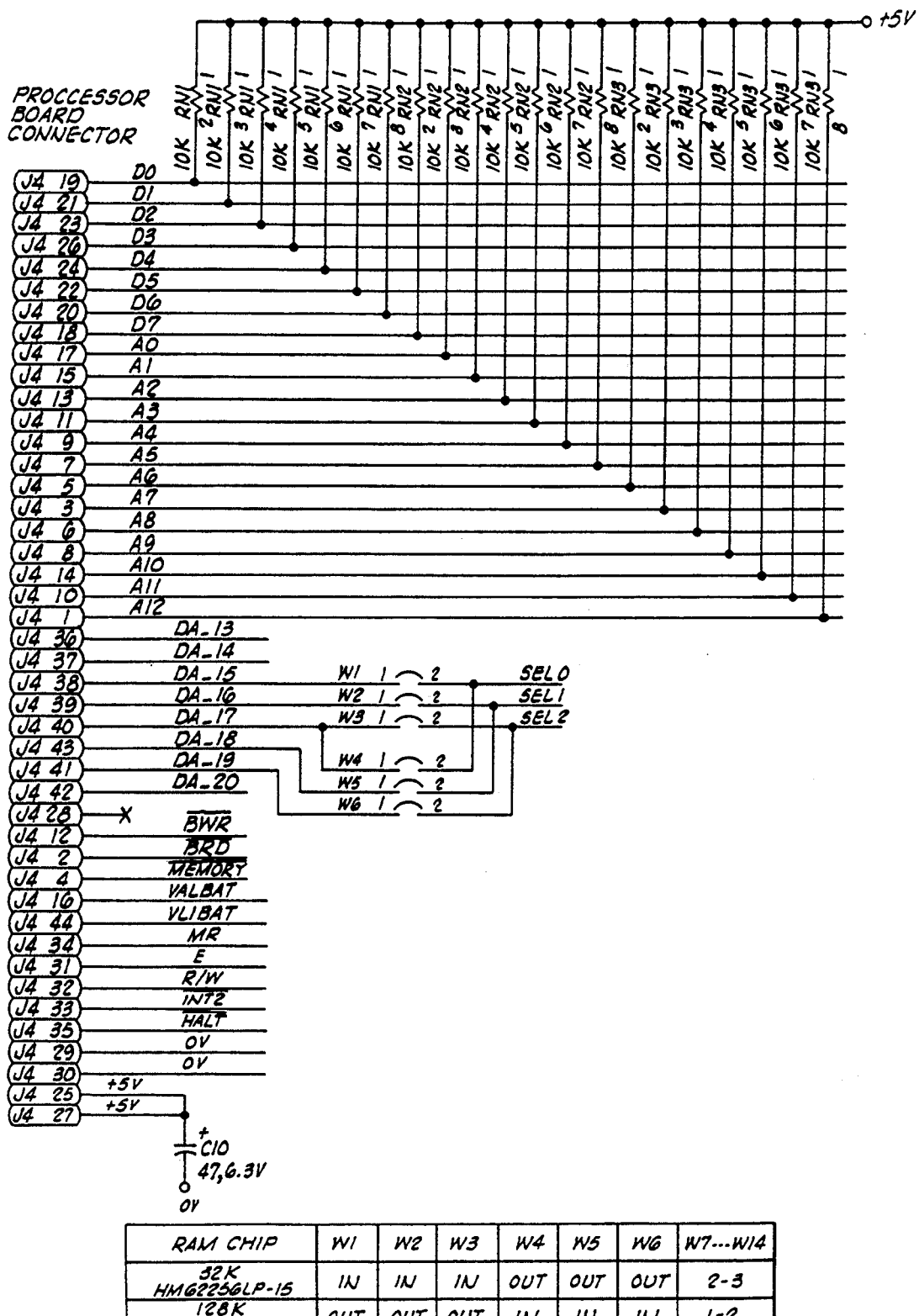

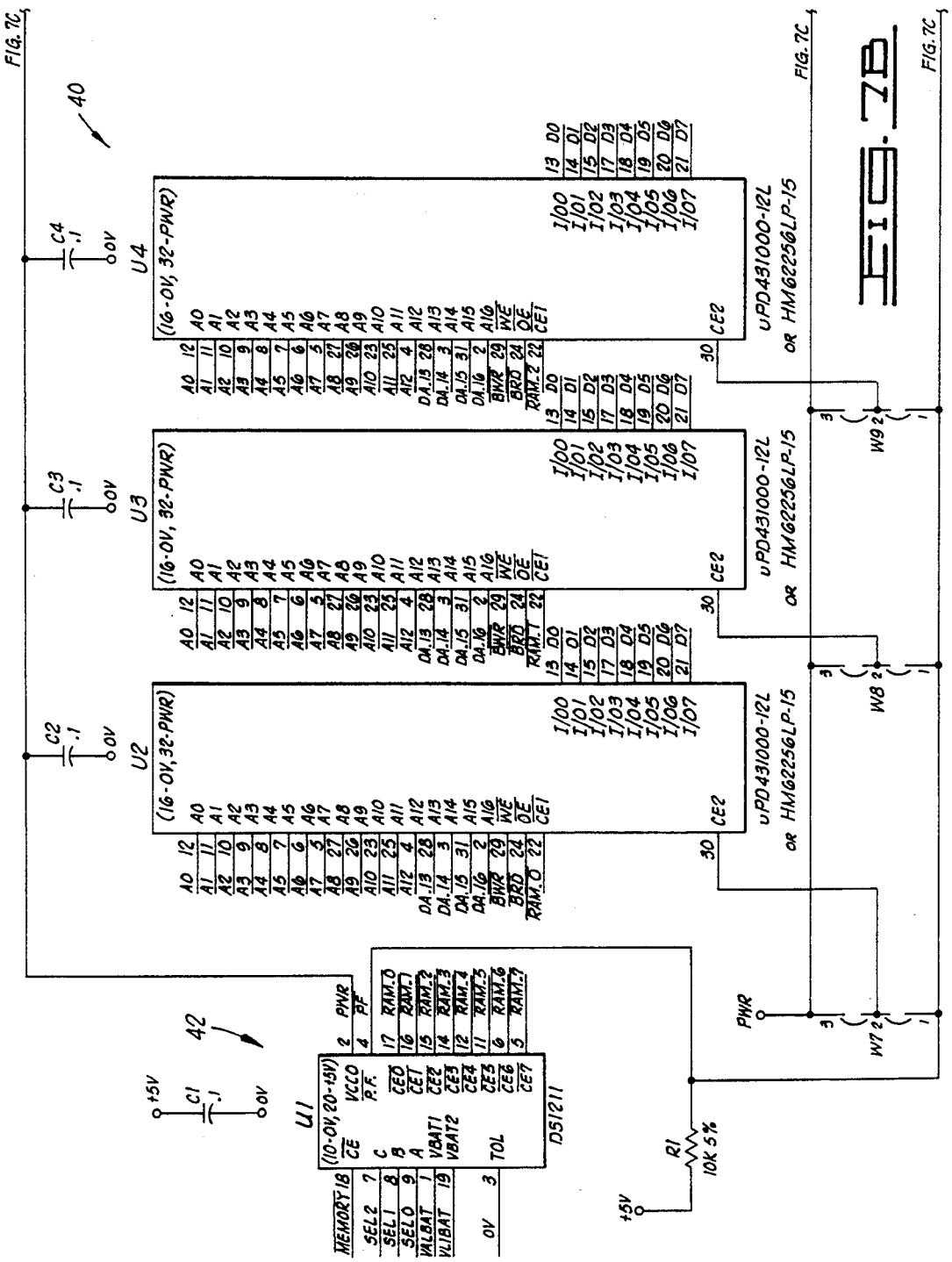

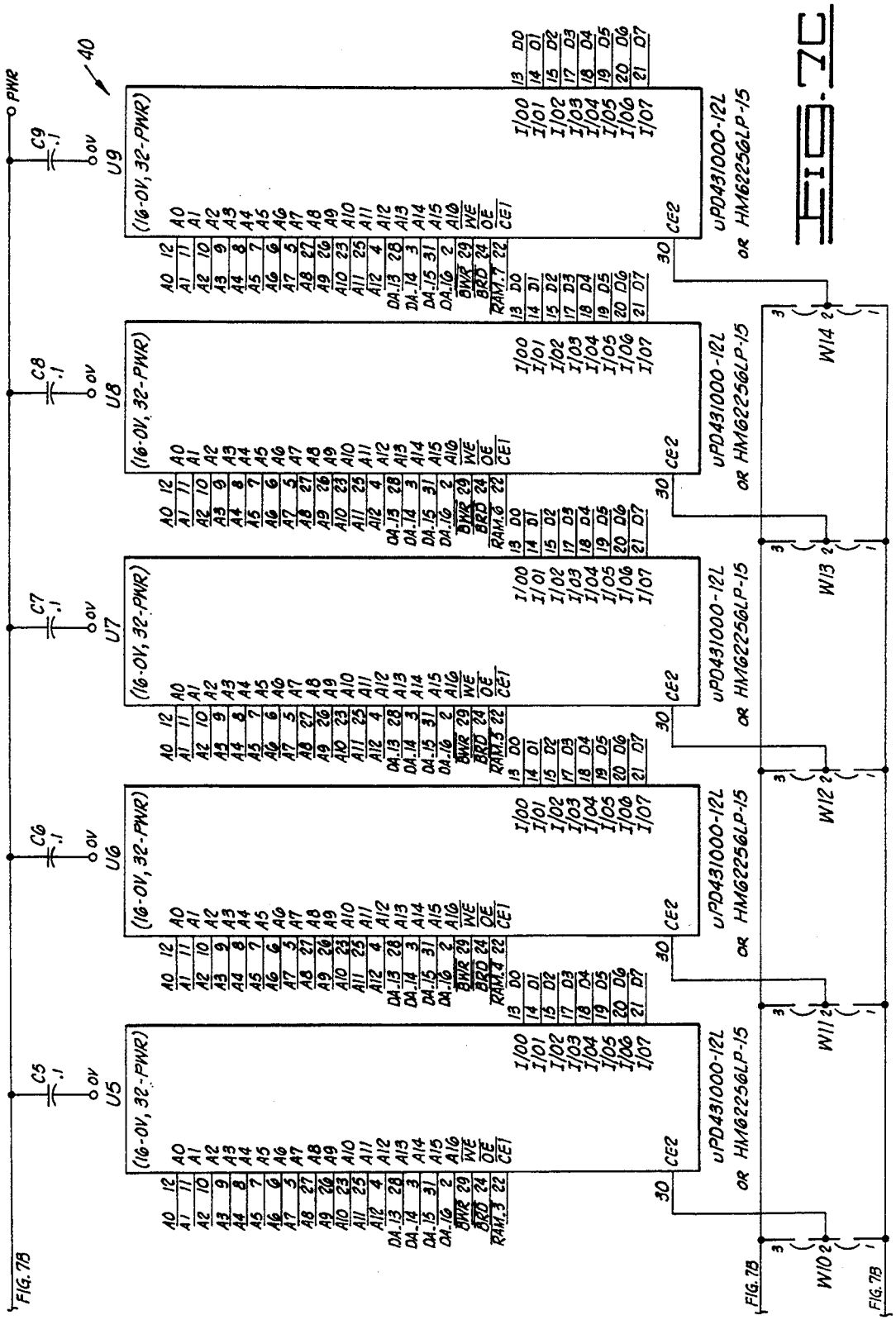

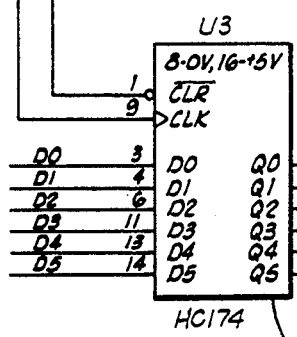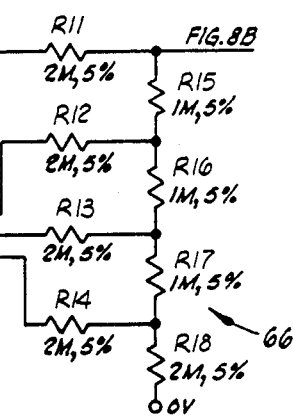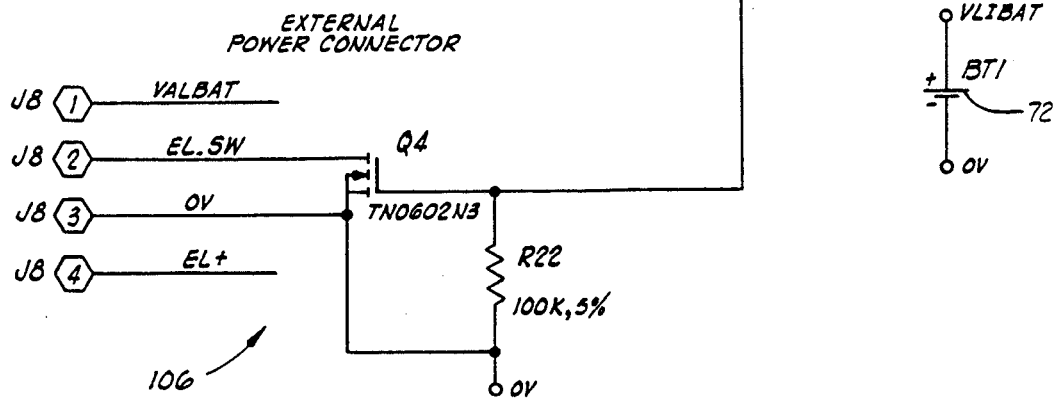
FIG. 8A

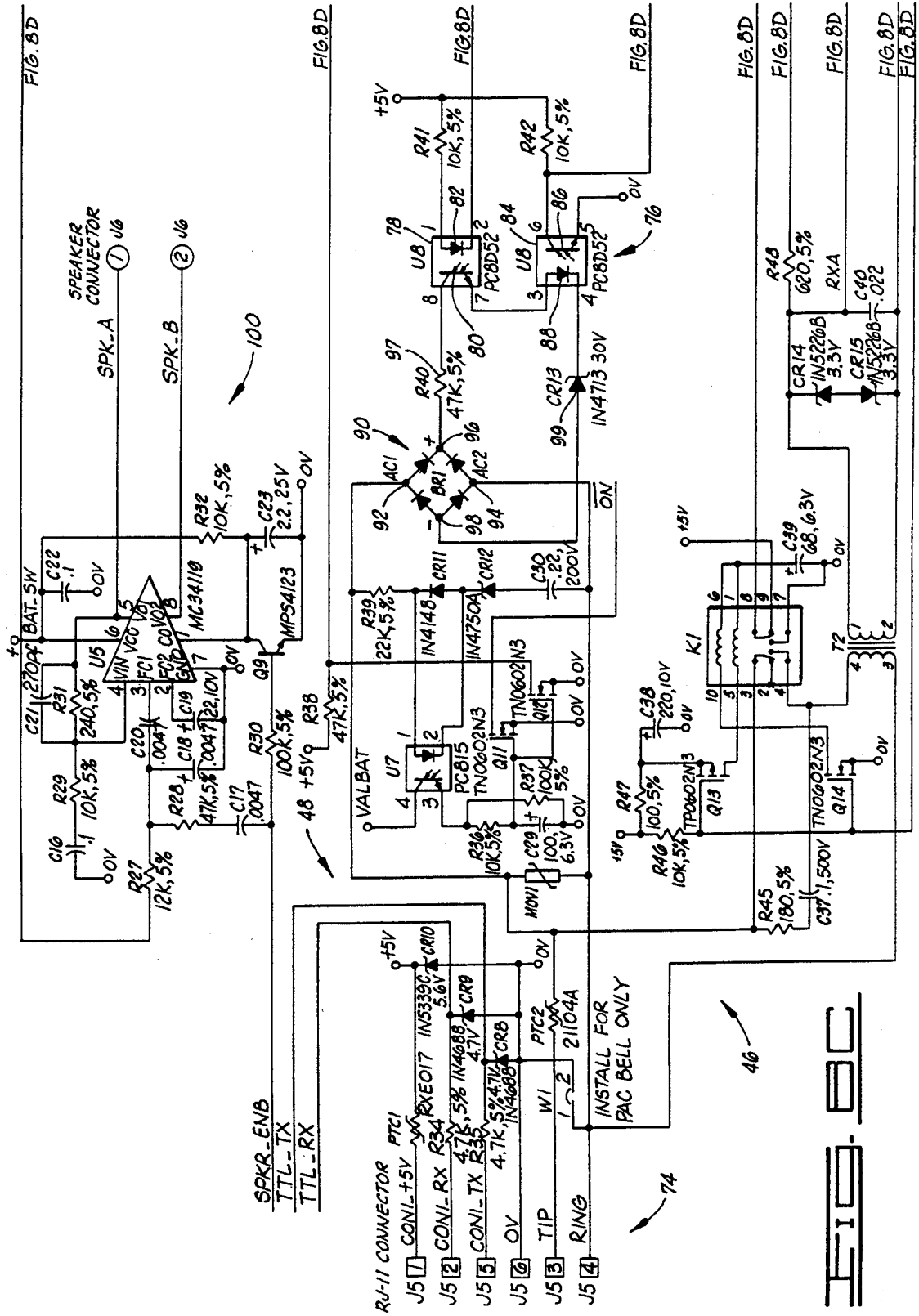

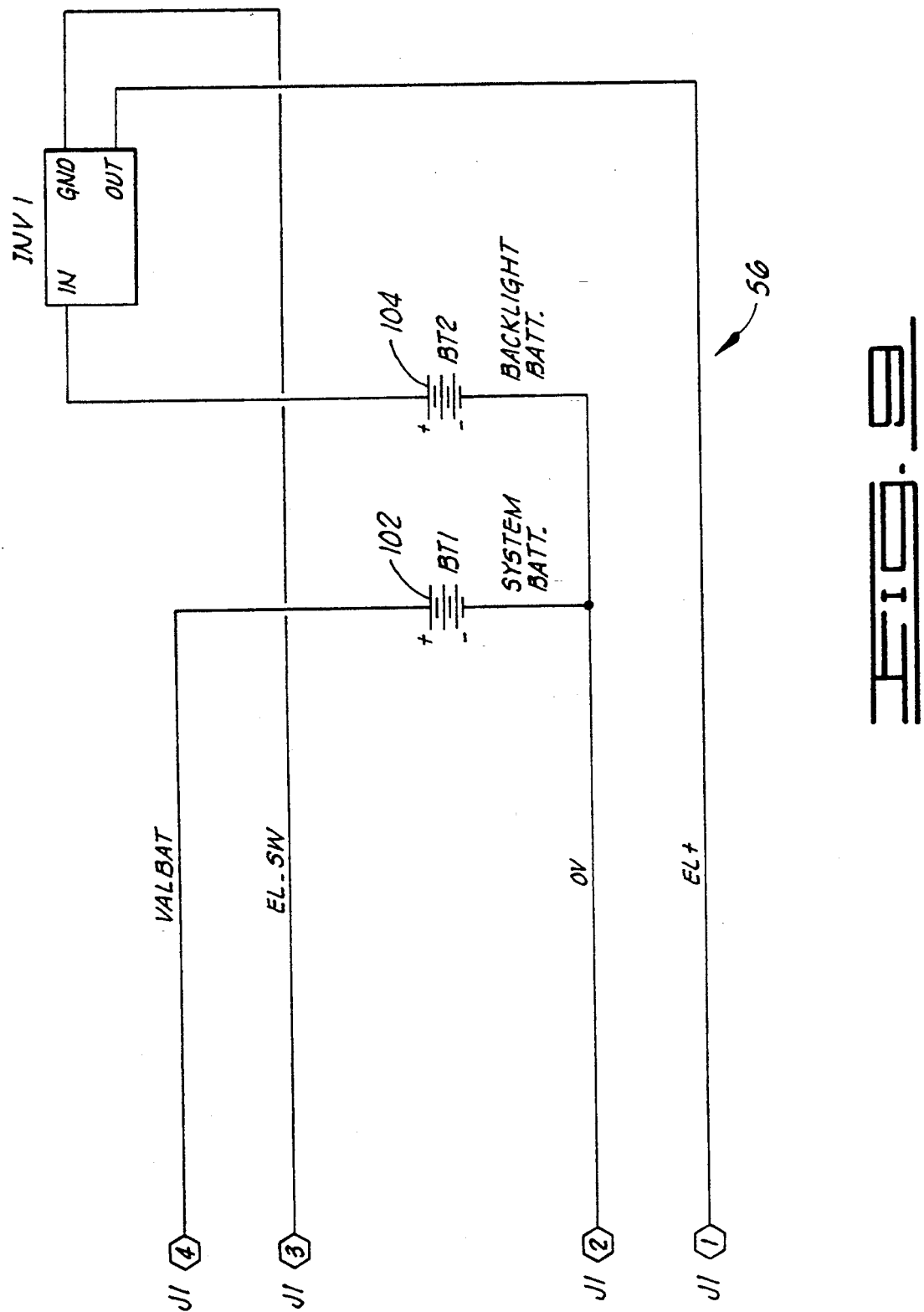

DATA TERMINAL HAVING PROGRAM LANGUAGE SUPPORT LIBRARY, AND RELATED METHOD

This is a continuation of copending application Ser. No. 07/514,318 filed on Apr. 23, 1990, now abandoned.

BACKGROUND OF THE INVENTION

This invention relates generally to data terminals for communicating over telephone circuits. This invention relates more particularly, but not by way of limitation, to a terminal for communicating with a gateway processor of a telephone operations and administrative system, one specific type of which is referred to as a craft technician's portable field terminal through which telephone maintenance dispatches and reports are made. Particular aspects of the present invention pertain to downloading applications programs to such a terminal, substantially noninvasively checking a telephone circuit to determine if it is active and idle, emulating different protocols so that the terminal can communicate with different types of computers, and sequentially displaying a larger page of data through a limited display area of the terminal.

In the telephone industry, individuals, referred to as craft technicians, must be in the field traveling from site to site where telephone instruments or telephone facility problems are found. Maintenance requests are typically collected at a central location and then dispatched to different individuals for attention. Once a problem has been attended to, the craft technician must report results back to the central location.

The computerization of this maintenance system has enabled the craft technicians to receive dispatches and submit reports without having to travel to and from or verbally communicate with the central maintenance location. The craft technician can now communicate with the central location through a hand-held portable field terminal such as is disclosed in U.S. Pat. No. 4,837,811 to Butler et al. This computerization of the maintenance system and the advent of the technician's field terminal has significantly improved the efficiency of the maintenance system.

Although terminals such as the type disclosed in U.S. Pat. No. 4,837,811 have proved advantageous, there are additional needs to be met to enhance further the utility of such terminals. One such need is to enable such terminals to receive programs, such as applications programs which the technician may wish to call up to perform a specific task (e.g., creating and filling out a time sheet), downloaded over conventional telephone circuits. Although a technician could take his or her terminal into the central office to be reprogrammed over a high speed data link if the terminal had enough memory to receive the transmission, this would be time-consuming and inconvenient from the technician's standpoint. Alternatively, preprogrammed add-on memories could be prepared at the central office and sent to or picked up by the technician, but this is also time-consuming and inconvenient. It would be preferable to download additional programs directly to a terminal at its remote location using a conventional telephone circuit. One problem which needs to be overcome in meeting this need is that transmission speeds over conventional telephone circuits are less than 2400 baud. To enable programs to be sent at such relatively slow speed without requiring too much time, there is the need for a means of permitting the programs to be sent in a reduced program code format and yet be reconstructed within the terminal into a fully executable program.

Although the types of terminals as already exist can connect to and determine if a particular pair of tip and ring lines of a telephone circuit are active (i.e., have a sufficiently energized battery connected to them) and idle (i.e., not then being used for a call), there is the need to improve the interface between the terminal and the tip and ring lines so that the telephone circuit is not significantly affected when the terminal is connected to the circuit to test whether it is active and idle.

Another needed improvement to these types of terminals is to enable them to communicate readily with various data communication formats or parameters requiring different communications protocols. Different computers may need to receive different information in different formats before they will accept an incoming call. These protocols are typically standard and can be entered when a call is placed to a particular computer; however, this can be very time consuming to a field technician working in the field if he or she has to do this each time a call is placed to a computer. Therefore, there is the need for the technician's terminal to permit different computer protocol emulation information to be entered and retained in the terminal, which information can be automatically communicated to the called computer when the computer's telephone number is dialed. Such computer protocol emulation information will be referred to herein as data communications profiles.

There is the further need for an improvement in such terminals whereby the craft technician can read through the limited display area available in a hand-held terminal a relatively large quantity of information which has been composed and conveyed in larger areas than the terminal display can display at one time.

SUMMARY OF THE INVENTION

The present invention meets the aforementioned needs by providing a novel and improved data terminal for communicating over a telephone circuit.

A particular embodiment of the present invention has the following advantages; however, not all of the advantages need to be present in a single embodiment to be within the scope of the present invention. One advantage is that the terminal can receive programs downloaded over a conventional telephone circuit. In a particular embodiment, the present invention allows an applications program to be sent in a condensed form so that less transmission time is needed. This is permitted by placing a program language support library in the terminal, which library is used to insert "missing" pieces of the transmitted program. The program reconstruction within the terminal occurs transparently to the terminal user so that once a program is downloaded, a title is automatically entered in a menu used by the user to select functions of the terminal and the "missing" pieces are automatically retrieved from the in-terminal program language support language as needed when the program is run.

Another advantage of the present invention is that it includes optical coupling to tip and ring lines through which substantially noninvasive testing of whether the tip and ring lines are active and idle can be made prior to placing a call over the telephone circuit.

Still another advantage of the present invention is that the user of the terminal can create a directory of both the computer telephone numbers which the user may wish to call and respective data communications profiles specific to each of the computers at the entered telephone numbers. The profiles are retained so that when one of the telephone numbers is called, the terminal automatically uses the respective profile to establish operative communications with the called computer.

A further advantage of the present invention is that a larger page of information than can be displayed through the display of the terminal at one time can be sequentially displayed in a manner in which the terminal user can readily read the underlying page of information.

With particular reference to a craft technician's terminal, the present invention comprises a microprocessor-based computer portable by the craft technician from job site to job site, which computer has a program language support library stored therein. Relatedly, the present invention also provides a method of adding an applications program to a craft technician's hand-held job dispatch terminal, comprising: connecting the job dispatch terminal to a telephone circuit; and downloading the applications program from a computer connected to the telephone circuit to the job dispatch terminal over the telephone circuit at a speed of not greater than 2400 baud.

Regarding the noninvasive active/idle test interface feature, the present invention provides an apparatus for determining whether a pair of tip and ring lines are active and idle, comprising: means for recognizing a signal as indicative of one of two states of a pair of tip and ring lines in a telephone system, which two states include a first state wherein voltage above a predetermined threshold is present across the tip and ring lines indicating that the tip and ring lines are active but idle, and a second state wherein voltage above the predetermined threshold is not present across the tip and ring lines indicating that the tip and ring lines are not active or are busy; and optical coupling means, responsive to voltage across the tip and ring lines and connected to the means for recognizing, for providing the signal to the means for recognizing in electrical isolation from the tip and ring lines.

The present invention also provides a craft technician's field terminal which permits a craft technician to access various host computers that utilize different data transmission standards without the terminal having to be reconfigured for each access, which terminal comprises: means for connecting the terminal to a telephone circuit and for calling a plurality of host computers connected to other respective telephone circuits; means for permitting a craft technician to enter in the terminal telephone numbers for calling the host computers while the craft technician is in the field; means for permitting the craft technician to enter and store in the terminal for repeated use respective data communications profiles in accordance with the respective data transmission standards for the host computers while the craft technician is in the field; and means for automatically using a respective stored data communications profile to place the terminal in operative communication with the respective host computer in response to the respective host computer being called through the terminal by the craft technician when the craft technician is in the field.

The present invention also provides a craft technician's field terminal having a limited size so that the terminal can be hand-carried by a craft technician in the field, which terminal comprises: display means for displaying textual information across a limited display area to a craft technician; means for storing informational data which exceeds the size of the display area of the display means; and means for outputting the informational data to the display means so that the informational data is presented sequentially across the limited display area as if the limited display were scanning a larger page containing the informational data.

Therefore, from the foregoing, it is a general object of the present invention to provide a novel and improved data terminal for communicating with a telephone circuit. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 5A–5C are schematic circuit diagrams of a processor board of the terminal of the preferred embodiment.

FIG. 6 is a schematic circuit diagram of the keyboard matrix of the terminal of the preferred embodiment.

FIG. 7A–7C are schematic circuit diagrams of the memory board of the terminal of the preferred embodiment.

FIGS. 8A–8D are schematic circuit diagrams of the power supply and modem board of the terminal of the preferred embodiment.

FIG. 9 is a schematic circuit diagram of the main power supplies of the terminal of the preferred embodiment.

DETAILED DESCRIPTION OF THE PREFERRED EMBODIMENT

Figure 1:
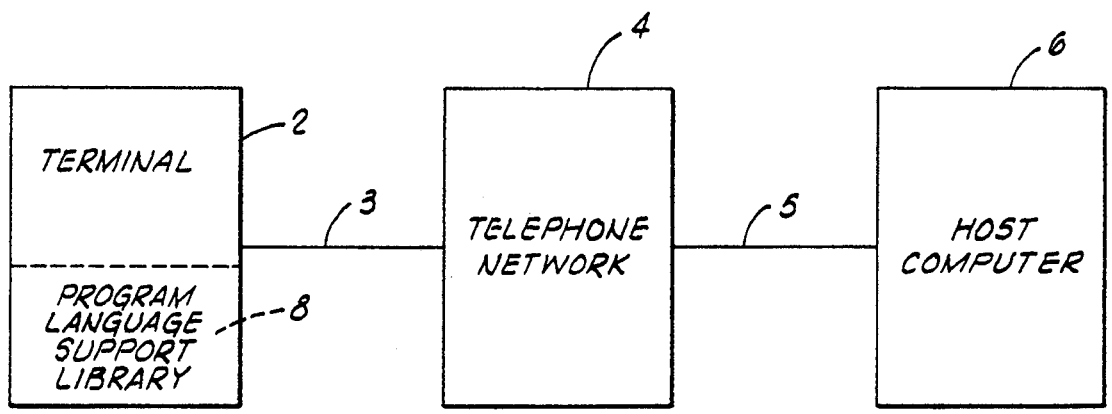
FIG. 1 is a functional block diagram showing a terminal of the present invention connected to a telephone network to which is also connected a host computer having an applications program to be downloaded through the telephone network to the terminal.

A terminal 2 constructed in accordance with the present invention is connected to the tip and ring lines of a conventional telephone circuit 3 of a telephone network 4 also having a conventional telephone circuit 5 with tip and ring lines to which a host computer 6 is connected as illustrated in the block diagram of FIG. 1. The terminal 2 of the specific implementation described subsequently herein is specifically a craft technician's portable field terminal comprising a microprocessor-based computer. The technician carries the terminal from job site to job site to receive maintenance dispatches and to generate and send reports about the maintenance the technician has performed. The terminal 2 may, however, be more generally defined as a terminal for communicating with a gateway processor connected to a telephone circuit. A gateway processor is part of the telephone network 4 and uses an access protocol such as AT&T's Craft Access System (CAS), Bellcore's Technician Access System (TAN) or CIBS's Force Access System (FAS). The preferred embodiment of the terminal 2 will be described herein with reference to its specific implementation as a craft technician's field terminal through which maintenance jobs are dispatched and maintenance reports sent.

To allow efficient transfer of programs (such as applications programs as will be specifically referred to herein) from the host computer 6 to the terminal 2 over the relatively low speed conventional telephone circuits 3, 5 of the telephone network 4, the preferred embodiment terminal 2 has a program language support library 8 stored in its microprocessor-based computer. The program language support library 8 includes the global or library references which are standard for the particular program language used to write the programs which are to be received and stored in the terminal 2. In the preferred embodiment the UNIX derived C program language is used. C is a particularly suitable language to be used in the present invention because it has a large number of operators and commands which can be used to write a wide variety of programs. Additionally C is a portable language in that a C program written on one computer can be run with little or no modification on any other computer with a C compiler. Another advantage is that C has a high execution speed. C also lends itself well to structured programming techniques, allowing the programmer to work in overall functions, modules or blocks which makes program debugging and maintenance easier.

In the preferred embodiment the standard C library is permanently stored in read only memory. Having this resident library enables an applications program to be sent from the host computer 6 through the telephone network 4 to the terminal 2 in a condensed form which can be expanded to the fully executable form inside the terminal 2 after transmission. Because of the reduced amount of code in the condensed program, the program can be transferred over the lower speed ordinary telephone line (having a maximum transfer rate of 2400 baud but a more practical transmission rate of approximately 1200 baud) without requiring an inordinate amount of time to complete the transmission.

More specifically, the host computer 6 is used to write or store an applications program which is to be sent to the terminal 2. The host computer 6 is a suitable type of computer, such as an IBM compatible personal computer. Within the host computer 6, a suitable linker program substitutes reduced codes in place of global or library references standard in the C language. This produces a condensed version of the applications program.

The terminal 2 is connected to the telephone network 4 and at a desired time, a call is placed either from the terminal 2 to the host computer 6 or vice versa and the condensed version of the applications program is transmitted, in a conventional encoded form, over conventional circuits of the telephone network 4. This is done at a speed of not greater than 2400 baud which is the upper practical limit of the conventional telephone circuits with which the present invention is contemplated to be typically (but not necessarily exclusively) used.

Once the condensed applications program has been received in the terminal 2 and the program is called to be run, the terminal 2 adds the program language global or library references in response to the identifiers placed in the condensed version. These conventional elements which are added are taken from the program language support library 8 stored in memory within the terminal 2. Thus, a fully executable applications program is then available within the terminal 2 without the terminal 2 having to be taken into a central office to be reprogrammed and without the craft technician having to physically modify the terminal (such as by installing a customized read only memory sent to the technician) and without having to use a high speed data transmission circuit.

A specific implementation of the terminal 2 which has the foregoing improvement as well as others will be described with reference to FIGS. 2–10. An exterior view of the specific implementation is shown in FIG. 2.

Figure 2:
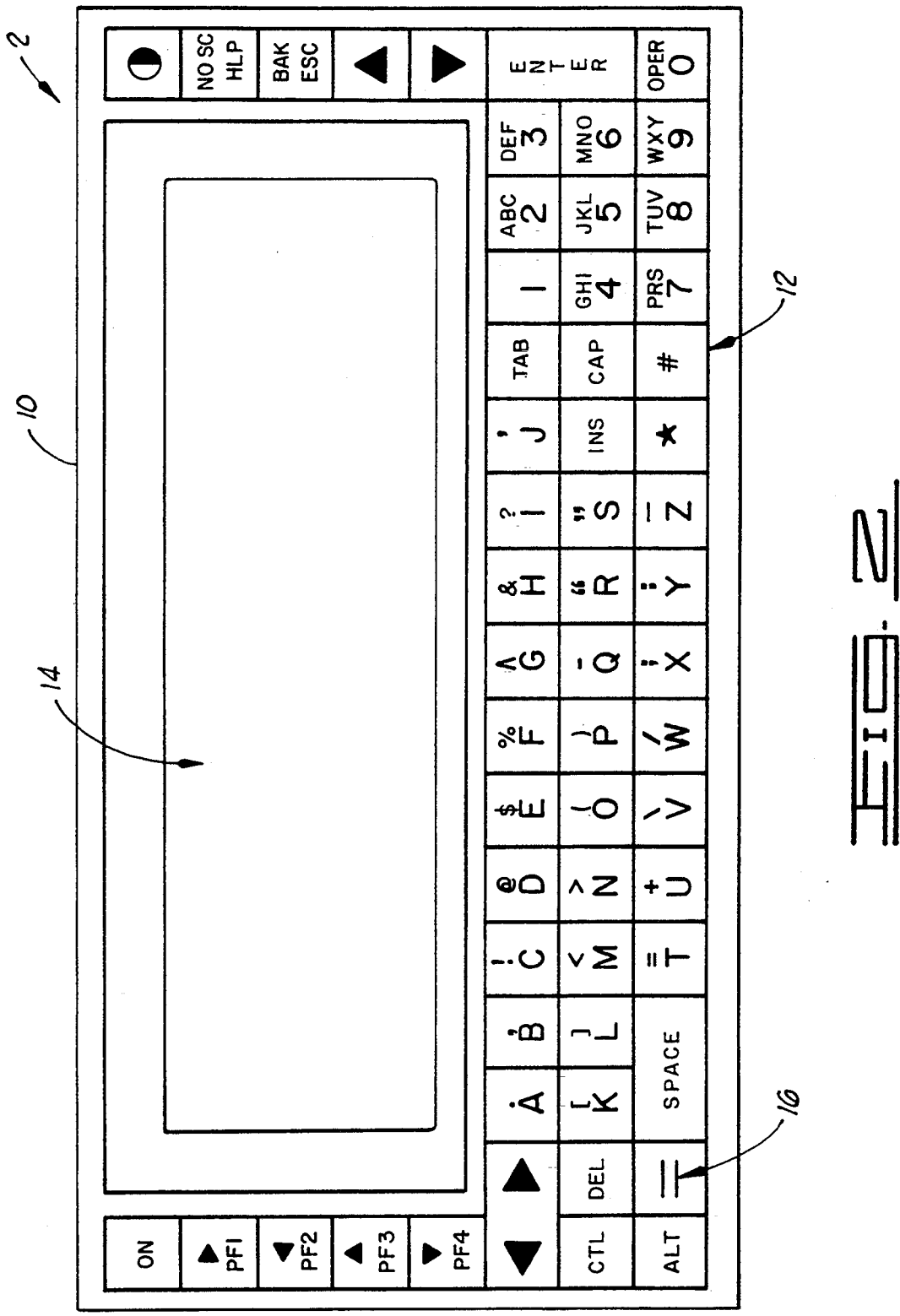
FIG. 2 is a plan view of a keyboard and display surface of a particular implementation of the terminal of the present invention.

The terminal 2 shown in FIG. 2 includes a housing 10 having a compact size which allows it to be held in a hand of a craft technician or other user of the terminal 2. One side of the housing 10 contains a keyboard 12 and a display 14. Openings 16 are also provided on the face of the housing 10, behind which openings 16 a loudspeaker is mounted.

As a general overview of the specific implementation, it has been developed using guidelines established by the Bellcore Technical Advisory TA-TSY-00063, Issue 2, January, 1988 as well as additional, novel design criteria. The specific implementation of the terminal 2 uses an 8-byte 6303Y static CMOS processor operating at 4.9 MHz. The C program language support library 8 is contained in a resident read only memory making remote customer programming over a dial-up connection a practical reality as described above. Other programs resident in the read only memory provide a text editor, a real-time clock/calendar, a communications program providing file transfer capabilities in a variety of standard protocols along with various terminal emulations including the Digital Equipment Corporation VT-100 and others. Another resident program manages scratch pad memories and a file transfer system. Applications programs for enabling access to various gateway processors using CAS, TAN or FAS protocols can be used. The specific implementation of the terminal 2 has a large easy-to-read graphics display providing up to eight lines of forty columns of text. A 56-key positive-action weather-proof keyboard includes four function keys, no scroll, break, control, alternate, insert, delete, etc. The terminal is powered by three AA alkaline or NiCad cells. These features are implemented using the hardware generally depicted in FIG. 3 and more particularly shown in FIGS. 5–9 and utilizing the memory having the memory map depicted in FIG. 4.

Figure 3:
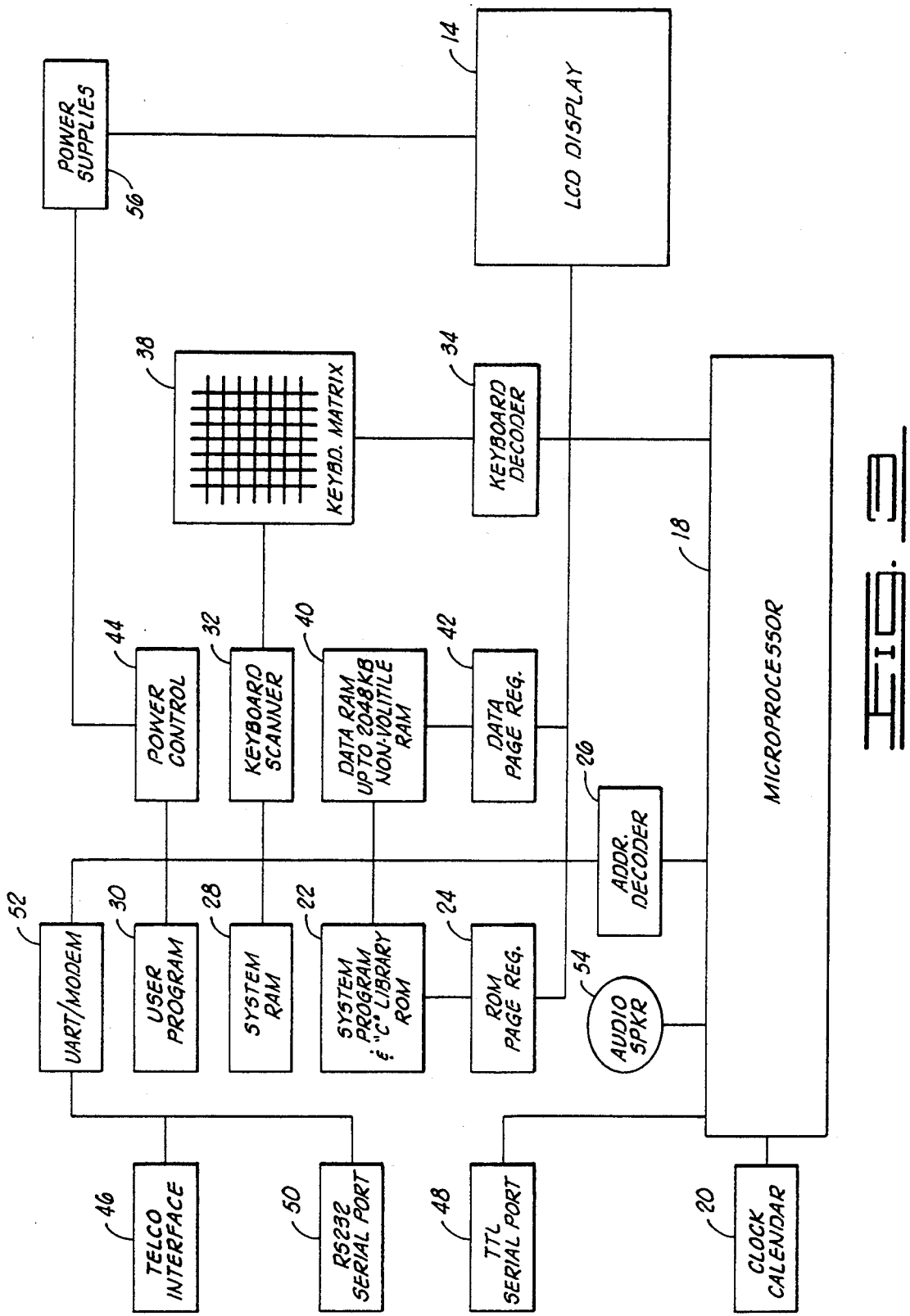
FIG. 3 is a functional block diagram of the terminal of the preferred embodiment of the present invention.

Referring to FIG. 3, contained within the housing 10 is a microprocessor 18. Connected to the microprocessor 18 is a clock calendar circuit 20. The microprocessor 18 runs under an operating system contained in a system program and program language support library read only memory 22 accessed through a read only memory page register 24 and an address decoder 26. A system random access memory 28 and a user program random access memory 30 are also included. A keyboard scanner 32 and a keyboard decoder 34 interface the microprocessor 18 and a keyboard matrix 38 which is actuated by the keyboard 12 shown in FIG. 2.

A data random access memory 40 accessed through a data page register 42 and the address decoder 26 are also contained within the housing 10.

The microprocessor 18 controls the power through a power control circuit 44. The microprocessor 18 makes external communications through a telephone network interface 46, a TTL serial port 48 and an RS232 serial port 50. The telephone network interface 46 and the RS232 serial port 50 connect to a universal asynchronous receiver transmitter(UART)/modem 52.

An audio loudspeaker 54, mounted behind the openings 16 shown in FIG. 2, is controlled by the microprocessor 18.

Power supplies 56 are controlled by the power control circuit 44 to operate the display 14.

Figure 4:
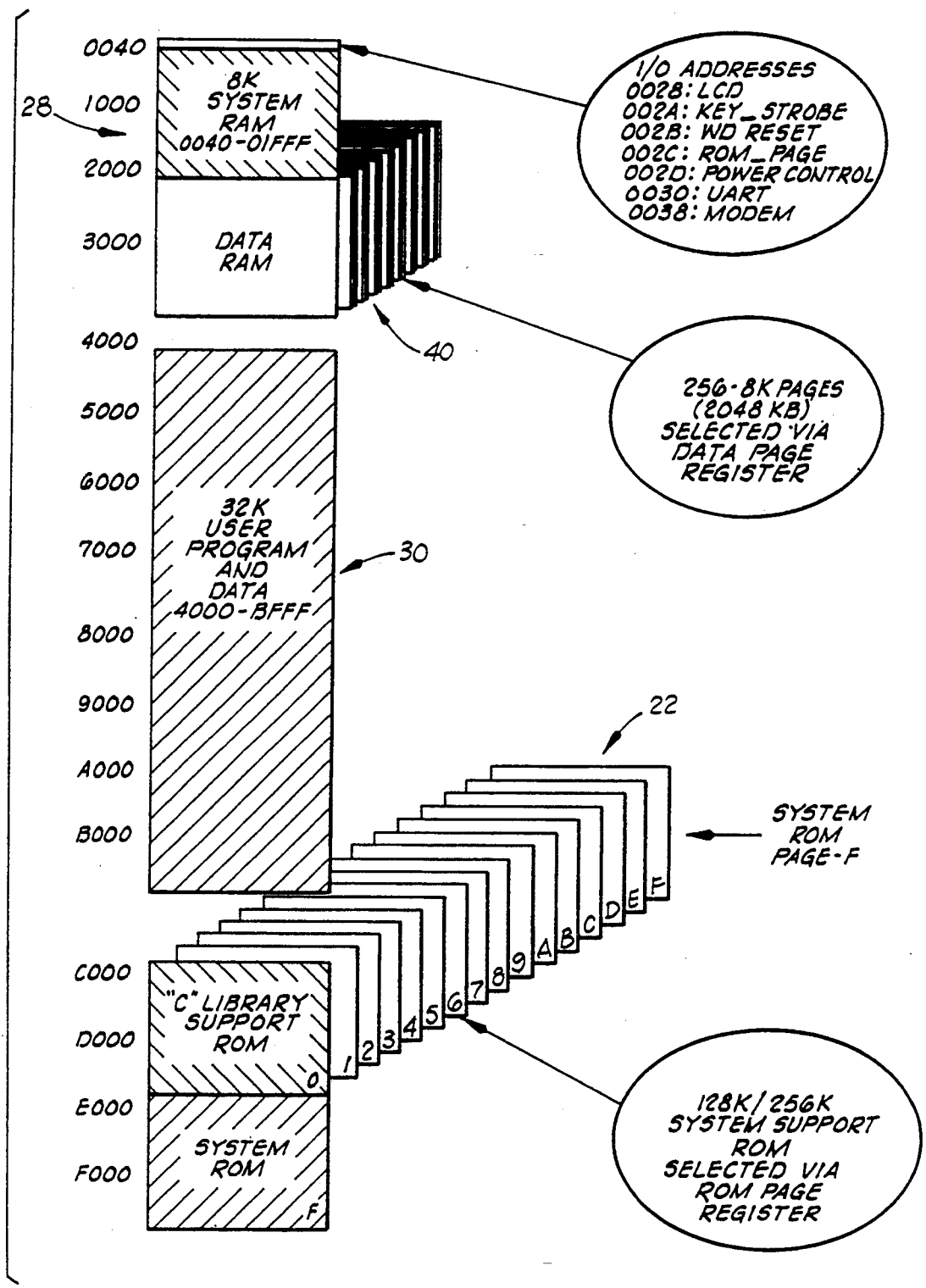
FIG. 4 is a diagram of the storage memories of the terminal of the preferred embodiment.

These functional units are specifically implemented as shown in FIGS. 5-9 which will be briefly described after reference to the memory maps shown in FIG. 4.

The memory maps shown in FIG. 4 for the memories 22, 28, 30, 40 show that the system read only memory 22 can be implemented with up to 256K bytes of read only memory which is adequate to store both the system operating program and the program language support library. The system random access memory 28 stores up to 8K bytes; the user program random access memory 30 stores up to 32K bytes; and the data random access memory 40 contains up to 2M bytes. ("Bytes" in the particular embodiment contain eight bits).

Reference will next be made to FIGS. 5-9 in briefly describing the specific implementations of the elements shown in FIG. 3. A more detailed description is not given herein because the drawings are sufficiently detailed that one having ordinary skill in the art will readily understand the specific implementation.

Figure 5C:
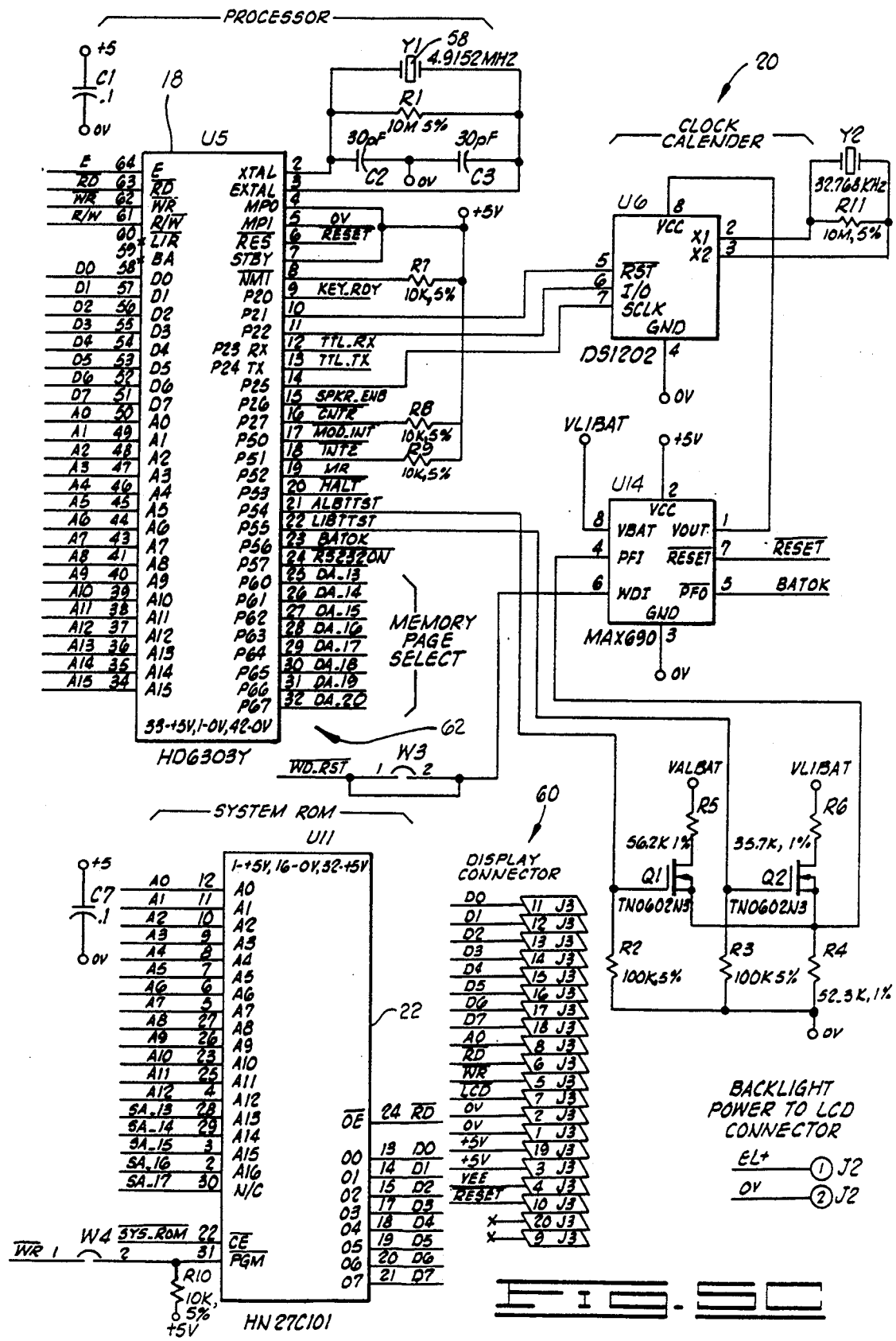

The components shown in FIG. 5 are mounted on one printed circuit board to which the various indicated connections are made to other boards or elements within the housing 10. The elements mounted on this board include the microprocessor 18 which operates on a time base derived from a crystal 58 (FIG. 5C). The clock calendar 20 is also shown in FIG. 5C, as is the system read only memory 22. The system random access memory 28 and the user program random access memory 30 are shown in FIG. 5B.

The system read only memory 22 contains the operating system and the program language support library by which missing global references are added to a received encoded applications program as has been described herein. The read only memory 22 is implemented in the specific embodiment by a single electronic storage read only memory integrated circuit chip fixed within the housing 10. The operating system of the specific implementation is listed in the accompanying Appendix 1. The program language support library contains the standard C library in the specific embodiment. The system read only memory 22 can be sized as needed. In the specific implementation, 32K bytes, 64K bytes, 128K bytes or 256K bytes can be used. Preselected circuit connections are made depending upon the size selected, namely, the straps W1 and W2 of the read only memory page register 24 (FIG. 5A) are connected as defined in the table shown on FIG. 5B.

The system random access memory 28 provides a scratch pad or operating space memory which the microprocessor 18 uses during its operations.

The user program random access memory 30 is the memory which receives the completed applications program and provides instructions from it to the microprocessor 18 when the applications program is to be run. Both the system random access memory 28 and the user program random access memory 30 are implemented in the specific embodiment by respective single electronic storage integrated circuit chips fixed within the housing 10.

Also contained on the board of FIG. 5 are the read only memory page register 24 (FIG. 5A) and the address decoder 26 (FIG. 5B). These provide means, responsive to the microprocessor 18, for accessing the system read only memory 22. The page register 24 provides a plurality of most significant bits of address to the memory 22 to access instructions from the operating system program and the program language support library. A chip select signal is provided by the address decoder 26, which also provides other chip select signals to access, for example, the system random access memory 28 and the user program random access memory 30.

Also contained on the board of FIG. 5 are the keyboard scanner 32 (FIG. 5A) and the keyboard decoder 34 (FIG. 5A). A connector 60 (FIG. 5C) for connecting to the display 14 is also contained on the board of FIG. 5.

The keyboard matrix 38 of the specific implementation is shown in FIG. 6. This matrix is connected to the keyboard scanner 32 and the keyboard decoder 34 shown in FIG. 5. In FIG. 6, other combinations of key functions are shown to illustrate that various keyboard layouts can be used.

Another printed circuit board contained within the housing 10 has the elements shown in FIG. 7. These elements include the data random access memory 40 (FIGS. 7B-7C) and its data page register 42 (FIG. 7B). The random access memory 40 is used for storing information received by the terminal over a telephone circuit, such as an applications program transmitted to the terminal over the telephone circuit from the host computer 6. Information generated through the keyboard 12 by the craft technician can also be stored in the memory 40. Individual pages of the memory 40 are selected in response to page select signals from the register 42. Other addressing of the memory 40 comes from the address lines of the microprocessor 18 and outputs from a data port 62 (FIG. 5C) through which a plurality of the most significant bits of the memory addresses are provided. For the implementation shown in FIG. 7, 1M bytes of data storage are provided; however, up to 2M bytes of storage can be accommodated by a different board containing twice as many memory chips as shown in FIG. 7 but still using the same connector lines as shown in FIG. 7 except that the DA20 signal is also used. Less than the full amount of memory can be used. Preselected circuit connections to be made for accommodating different amounts of this data storage are shown in the table in FIG. 7A.

A printed circuit board containing the power control 44, the telephone network interface 46, the TTL serial port 48, the RS232 serial port 50, the UART/modem 52 and the control for the audio speaker 54 is shown in FIGS. 8A-8D. This board is also mounted in the housing 10.

Figure 8B:
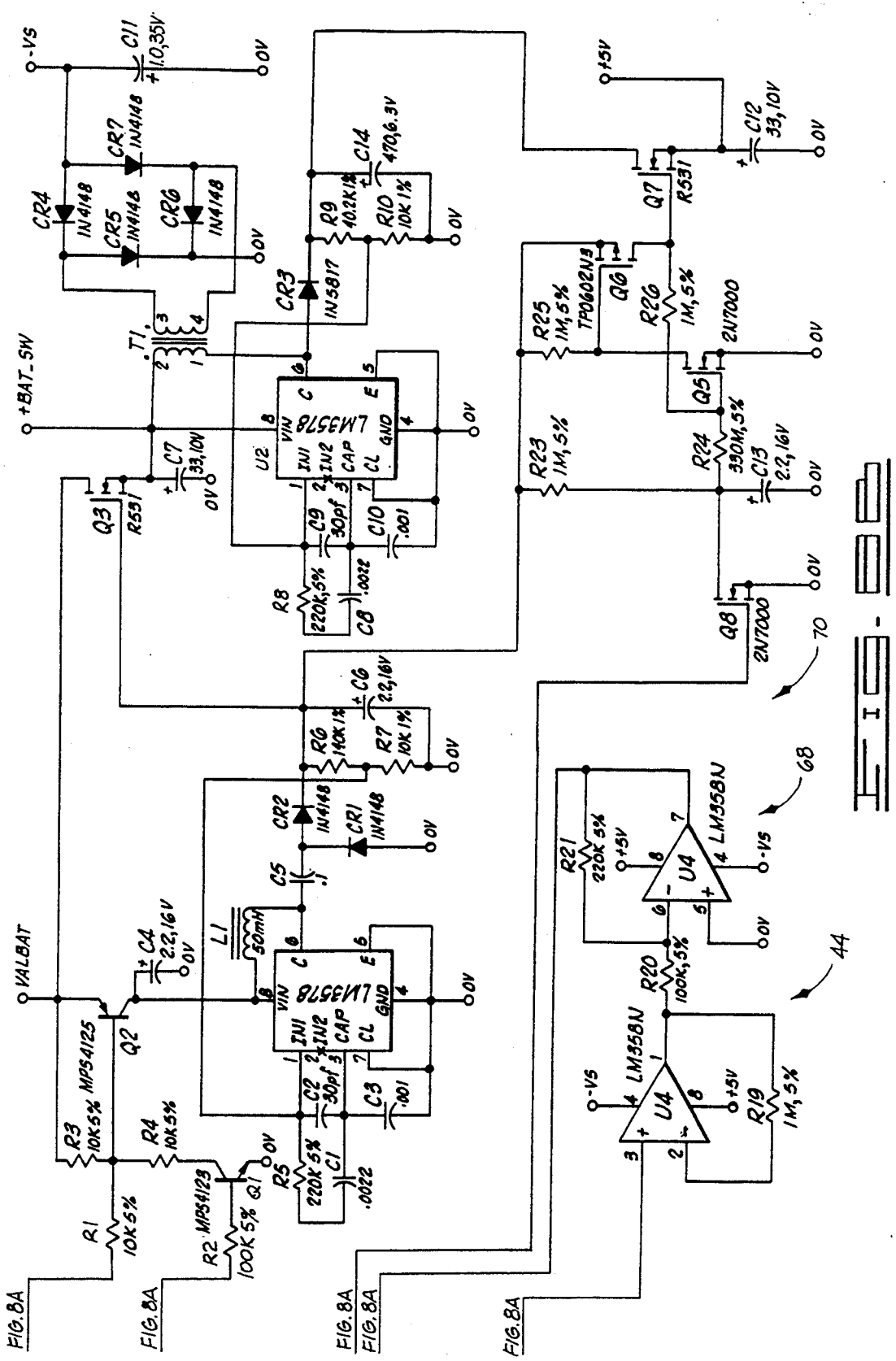

The power control 44 is shown in FIG. 8B. This control sets the contrast in the display 14 under control from the microprocessor 18 through a register 64 which selects sections of a resistor network 66 to create different selectable voltages at the output of operational amplifiers 68.

Also shown in FIG. 8B is a circuit 70 for providing the various regulated voltages needed in the specific implementation of the present invention. A lithium battery 72 mounted on the board shown in part in FIG. 8A provides backup power to insure the non-volatility of the data RAM 40.

Figure 8D:
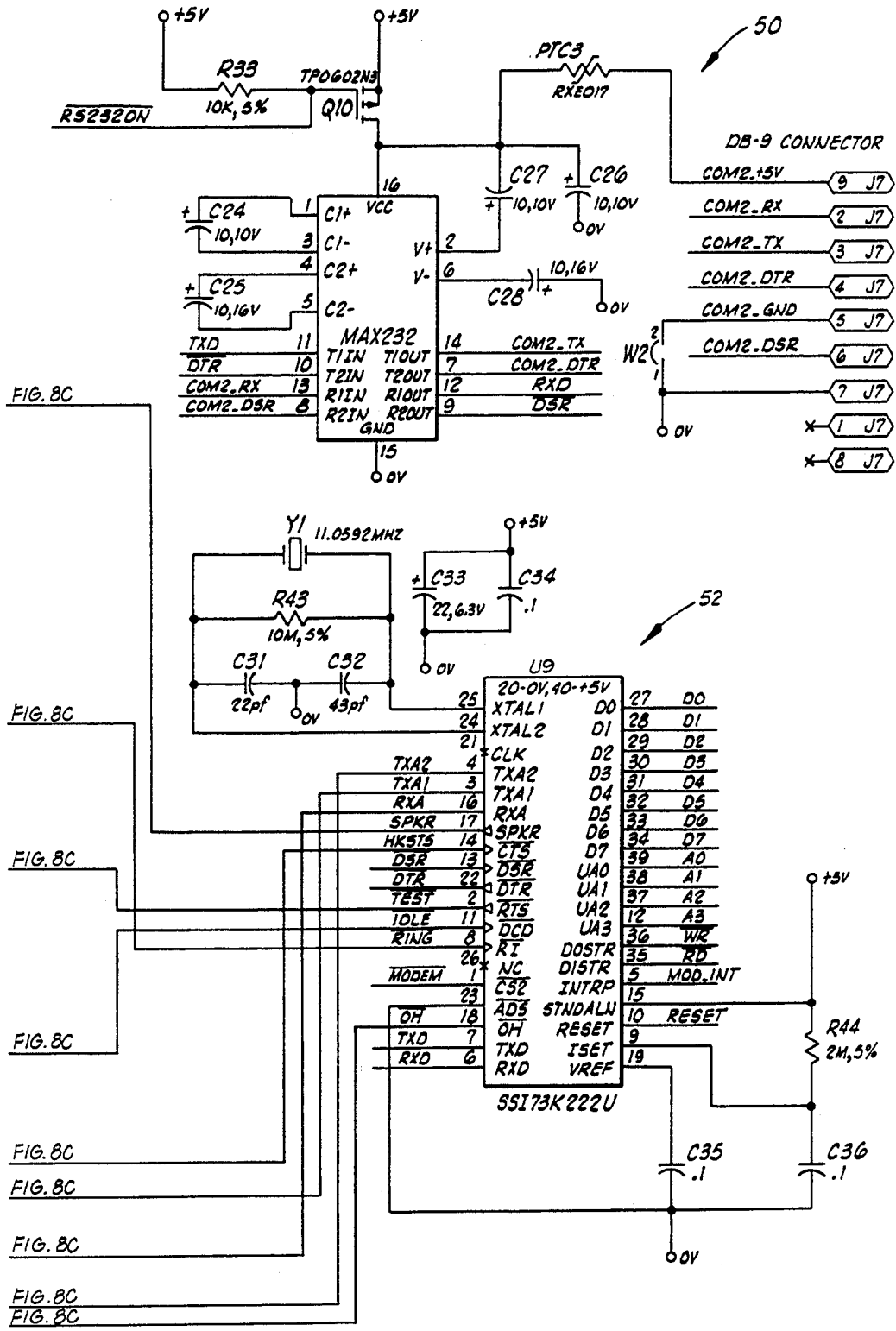

The telephone network interface 46 shown in FIG. 8C connects to an external telephone circuit through a conventional RJ-11 connector 74. The TTL serial port 48 is also provided through the connector 74. The telephone network interface 46, and the RS232 serial port 50 shown in FIG. 8D, connect to the UART/modem 52 (FIG. 8D). The circuits are conventional except for a portion of the interface 46 by which a substantially non-invasive test of a telephone circuit connected through the connector 74 can be checked to determine if it is active (i.e., that it has an energized battery connected to it) and idle.

The microprocessor 18 is programmed to recognize a signal as indicative of one of two states of a pair of tip and ring lines of the telephone circuit to which the connector 74 (FIG. 8C) is connected. One state exists when a voltage above a predetermined threshold is present across the tip and ring lines indicating that the tip and ring lines are active but idle. A second state exists when a voltage above the predetermined threshold is not present across the tip and ring line indicating that the tip and ring lines are not active or are busy. This signal in one of the two states is provided by an optical coupling means 76 (FIG. 8C) of the interface 46 which responds to voltage across the tip and ring lines to which the connector 74 is connected.

The optical coupling means 76 includes an optical coupler 78 comprising a photo responsive transistor 80 and a light emitting diode 82. The optical coupling means 76 also includes an optical coupler 84 comprising a photo responsive transistor 86 and a light emitting diode 88. The emitter of the transistor 80 is connected to the anode of the light emitting diode 88, and the collector of the transistor 80 and the cathode of the diode 88 are connected to means for connecting to the pair of tip and ring lines. This means includes the connector 74 and a full-wave rectifier bridge 90 including a node 92 which can be connected to the tip line through the connector 74, a node 94 which can be connected to the ring line through the connector 74, a node 96 connected to the collector of the transistor 80 through a current-limiting resistor 97, and a node 98 connected to the cathode of the diode 88 through a voltage threshold setting Zener diode 99.

The diode 82 of the optical coupler 78 is connected to means for enabling the optical coupler 78, 84 to be responsive to voltage across the tip and ring lines. This means specifically provides the RTS signal from the UART/modem 52 (FIG. 8D) in response to control from the microprocessor 18.

The transistor 86 of the optical coupler 84 is connected to means for detecting the response of the optical couplers 78, 84, which response indicates whether the tip and ring lines are active and idle. This includes providing a signal to the DCD input of the UART/modem 52 and on to the microprocessor 18.

Because of the electrical isolation provided through the optical couplings of the couplers 78, 84 there is not a substantial invasion or affect on connected tip and ring lines when the present invention tests for the presence of the active/idle indicating voltage. To test for the voltage, the microprocessor 18 causes the UART/modem 52 to turn the diode 82 on (make conductive), which in turn turns on the transistor 80. This occurs for only a few milliseconds (e.g., 10 milliseconds or less), but it is long enough to allow a sufficient voltage, if there is one, on the connected tip and ring lines to actuate the diode 88, which in turn actuates the transistor 86 to send a signal to the microprocessor 18 through the UART/modem 52. If insufficient voltage is across the tip and ring lines during this time, the diode 88 is not turned on so that the other state of the signal through the input of the UART/modem 52 is provided to the microprocessor 18, thereby indicating that the circuit is busy or that there is an insufficient voltage for it to be operative. The portion of the appended program listing where this function is controlled is found at lines 5809 to 5830.

Also shown in FIG. 8C is a circuit 100 by which the audio speaker 54 (FIG. 3) is controlled.

Referring to FIG. 9, a system battery 102 and a backlight battery 104 are shown. These provide voltages to external power connector 106 shown in FIG. 8A. The batteries 102, 104 of the particular embodiment are contained in a carrying case in which the housing 10 is conveniently stored and used.

Referring to FIGS. 1, 4, 5 and 7, the program downloading capability of the present invention will be more particularly described with reference to downloading an applications program. Initially, a programmer writes the applications program or otherwise enters it into the host computer 6 (FIG. 1). This program is written in the selected program language, which in the specific implementation described herein is C. The applications program as written is processed within the host computer 6 through a linker program. This type of program normally would link what the programmer has written with the program language library. With respect to C program language, a linker program by 2500AD Software Inc. could be used; however, for use with the present invention, the customary linking procedure is modified to link the written program with much shorter tokens having a one-to-one correspondence with respective globals of the program language library. For example, instead of linking the program to a 1K byte global in the program language library, the program could be linked to a 5 byte token. A source code listing of the program used in the host computer 6 to generate the token library for the linker to use to link to the applications program as used in the specific implementation described herein is given in Appendix 2. This is used in the host computer 6 in a manner otherwise known to those skilled in the art.

When the thus token-linked program is downloaded to the terminal 2 (which downloading is controlled by the portion of the operating system including lines 3630–4299 of Appendix 1), it is comtemplated that the condensed form program will be stored as a file in the data random access memory 40 (FIGS. 7B–7C). A caption will be added to a menu within the terminal 2. When the terminal user selects the applications program via the menu, the respective file will be transferred to the user program random access memory 30 (FIG. 5B) where it will be run by the microprocessor 18 under control of the operating system stored in the system read only memory 22 (FIG. 5C).

As the program is run from the user program random access memory 30, the tokens which were inserted at the host computer 6 are detected and the program language support library 8 is accessed to utilize the appropriate globals represented by the tokens. This is controlled in the particular implementation by the portion of the operating system at lines 3444–3550 in Appendix 1. This control operates in conjunction with the system page register 24 and latch section 25 (FIG. 5A). These hardware elements are used to generate system page addresses SA13-SA17. These addresses select the pages of the program language support library 8 in the system read only memory 22 represented in FIG. 4. The latch 25 latches addresses SA13-SA16 onto the data bus for the microprocessor 18 to monitor. A source code listing of the program used in the terminal 2 and accessed using the system page addresses is given in Appendix 3. The operating system makes the conversion from a detected token to a page address, and the program of Appendix 3 responds to the address with the operative program language function to replace the token. Thus, as the program in the memory 30 is run, the operating system detects each token and causes the microprocessor 18 to select the appropriate page of the program language support library for implementing the actual program language library global represented by the detected token. Complete operability is thereby obtained within the terminal 2 and yet a condensed form of the program created within the host computer 6 has enabled more efficient transmission to occur between the host computer 6 and the terminal 2 during a download over a conventional low speed telephone circuit.

Besides the ability to download programs and the ability to test for active and idle conditions of a connected telephone circuit in a substantially noninvasive manner, the specific implementation of the present invention is contemplated to include two other improvements: (1) the ability to preset various types of computer protocols for automatic use when a particular computer is called by the terminal 2, and (2) the ability to display text sequentially from larger pages than can be shown at one time through the display 14.

The ability to preset various types of computer protocols will permit a craft technician to enter in the terminal 2 telephone numbers for calling various host computers while the craft technician is in the field. It also permits the craft technician to enter and store in the terminal 2 for repeated use respective data communications profiles for the host computers while the craft technician is in the field. In response to the craft technician calling one of the host computers, the program automatically uses the respective stored data communications profile to place the terminal in operative communication with the respective host computer. This obviates the necessity of the craft technician manually entering the needed protocol information each time the technician calls a particular host computer.

More particularly, a craft technician enters and stores within the terminal 2 access numbers of various host computers while the craft technician is in the field. A series of questions is displayed to the craft technician in the field in response to the technician entering a new host computer access number into the terminal 2. In response to these questions, the craft technician enters and stores within the terminal answers to the questions while the craft technician is in the field so that data communications profiles are created. From this, a directory of the access numbers and respective data communications profiles is retained in the terminal. When one of the access numbers is called from the terminal, the respective data communications profile is automatically called and implemented to establish operative communications with the called computer. These are contemplated to be implemented via the microprocessor 18, its operating system and the keyboard 12.

Figure 10:
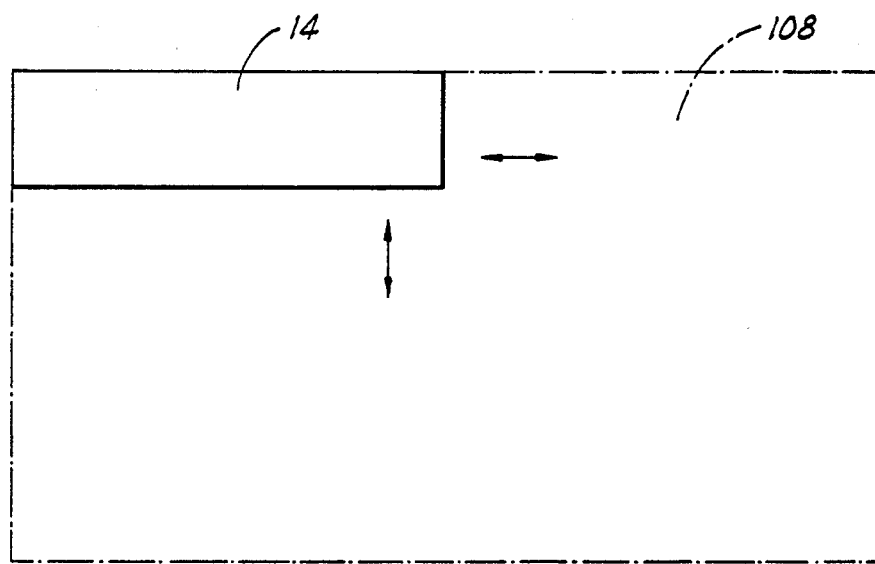
FIG. 10 is a schematic illustration showing the display area of the terminal of the preferred embodiment in relation to a larger page of data which is to be sequentially displayed through the display area of the terminal.

The ability to display text sequentially is implemented through a portion of the program of Appendix 1 within lines 6630-9235. What is accomplished by this part of the program is to effectively overlay the display area of the display 14 over a larger page of text 106 as schematically illustrated in FIG. 10. The program effectively "moves" the display 14 across and down the page of text 106 in a sequential manner which can be easily followed by the user of the terminal 2. "Movement" of display 14 is manually controllable by the user using the PF1-PF4 keys on the keyboard 12. When functioning automatically, the display shows the active area where the cursor is. In the particular implementation, the display 14 can display 40 columns by 8 lines of text at one time. The page 106 has a size of 80 columns by 25 lines. Thus, the display 14 can display textural information across a limited display area, whereas informational data which exceeds the size of the display area of the display 14 can be stored within the data random access memory 40 of the terminal 2. The microprocessor 18 and the subject portion of the operating program contained within the read only memory 22 provide means for outputting the informational data to the display 14 so that the informational data is presented sequentially across the limited display area as if the limited display area were scanning the larger page containing the informational data.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined in by the appended claims.

What is claimed is:

1. A method of modifying the programming and operation of a microprocessor-based computer in a telephone company craft technician's portable, hand-held field terminal, said method comprising:

writing in C program language an applications program for a microprocessor-based computer in a telephone company craft technician's portable, hand-held field terminal, including using conventional references from a standard support library for the C program language;

condensing the applications program so that the conventional references used in the program are replaced by shorter tokens, including processing the applications program with a conventional linker program in conjunction with a token library program for use by the linker program in creating from the applications program a token-linked applications program;

downloading the token-linked applications program to the computer in the field terminal;

storing the token-linked applications program as a file in a random access memory of the computer in the field terminal;

adding to a menu stored in the field terminal a caption identifying the stored file; and running the token-linked applications program in the field terminal, including:

displaying the menu in the field terminal;

selecting from the menu the file containing the token-linked applications program;

detecting a token in the selected token-linked applications program;

converting a detected token to a respective address of a read only memory in the field terminal containing the standard support library for the C program language; and performing, in sequence during the running of the token-linked applications program in the field terminal, the operation of the conventional reference of the standard support library stored at the respective address.

2. A method as defined in claim 1, wherein the token library program provides a respective fixed length token in place of a respective conventional reference used in the applications program and contained in the standard support library.

3. A method as defined in claim 2, wherein the fixed length is five bytes.

4. A method of adding an applications program written in a conventional program language to a craft technician's portable job dispatch terminal and running the program therein, said method comprising:

connecting a craft technician's portable job dispatch terminal to a telephone circuit to which a computer containing an applications program written in a conventional program language is also connected, wherein the applications program as written includes a plurality of conventional elements defined in a program language support library for the conventional program language;

downloading a condensed form of the applications program from the computer to the portable job dispatch terminal over the telephone circuit, wherein the condensed form of the applications program is missing at least one of the conventional elements defined in the program language support library for the conventional program language in which the applications program is written and includes a respective token in place thereof, and wherein the respective token is always shorter than the conventional element it replaces; and performing in the portable job dispatch terminal, in response to the respective token and a copy of the program language support library stored in memory within the portable job dispatch terminal, the operation of the at least one conventional element missing from the downloaded applications program when the downloaded applications program is run in the portable job dispatch terminal.

5. A method as defined in claim 4, wherein each respective token has the same fixed length.

6. A method as defined in claim 5, wherein the fixed length is five bytes.

7. A program-alterable portable field terminal enabling a telephone company craft technician to communicate with a gateway processor of a telephone operations and administration system for receiving telephone maintenance dispatches and for sending telephone maintenance reports, said terminal comprising:

a housing for being held in a hand of a telephone company craft technician so that said housing is portable by the technician from job site to job site;

a keyboard mounted on said housing;

a display mounted on said housing;

a microprocessor disposed in said housing and connected to said keyboard and said display;

a memory disposed in said housing in communication with said microprocessor;

an operating system program stored in said memory;

a program language support library of a conventional program language for writing computer programs, said program language support library including standard program language references stored in said memory;

means for connecting said terminal with a telephone circuit over which is received an applications program initially coded in the conventional program language and standard program language references of the program language support library thereof but transmitted to said terminal over the telephone circuit with at least one of said initially coded standard program language references missing from the received program; and wherein said microprocessor, said keyboard, said display, said memory, said operating system program and said program language support library provide means for running the received applications program in said terminal, including means for accessing said memory to retrieve the at least one of said initially coded standard program language references missing from the received program.

8. A field terminal as defined in claim 1, wherein said means for accessing is responsive to different respective tokens, each having the same fixed length, contained within the transmitted applications program in place of respective ones of the initially coded standard program language references missing from the received program.

9. A field terminal as defined in claim 8, wherein the fixed length is five bytes.

* * * * *

UNITED STATES PATENT AND TRADEMARK OFFICE
CERTIFICATE OF CORRECTION

Patent No.: 5,377,259

Dated: December 27, 1994

Inventor(s): Myron C. Butler and Christopher Madore

It is certified that an error appears in the above-identified patent and that said Letters Patent is hereby corrected as shown below:

Column 14, line 41, change "1" to --7--.

Signed and Sealed this

Twenty-eight Day of March, 1995

Attest:

BRUCE LEHMAN

Attesting Officer    Commissioner of Patents and Trademarks